United States Patent [19]

Ismar

[11] Patent Number: 5,758,962
[45] Date of Patent: Jun. 2, 1998

[54] CONTINUOUS KNEADING MACHINE FOR DOUGHS

[75] Inventor: Thomas Theodor Ismar, Köln, Germany

[73] Assignee: Ismar Maschinen GmbH, Cologne, Germany

[21] Appl. No.: 649,613

[22] PCT Filed: Nov. 19, 1994

[86] PCT No.: PCT/EP94/03841

§ 371 Date: Jul. 3, 1996

§ 102(e) Date: Jul. 3, 1996

[87] PCT Pub. No.: WO95/14386

PCT Pub. Date: Jun. 1, 1995

[30] Foreign Application Priority Data

Nov. 20, 1993 [DE] Germany ............... 43 39 628.3

[51] Int. Cl.⁶ ............... A21C 1/06; A21C 1/14
[52] U.S. Cl. ............... 366/97; 366/300; 366/301; 366/325.3; 366/325.7
[58] Field of Search ............... 366/64, 66, 96–99, 366/297–301, 325.3, 325.6, 325.7, 325.8, 325.9, 325.91

[56] References Cited

U.S. PATENT DOCUMENTS

| | | | |
|---|---|---|---|
| 4,650,338 | 3/1987 | List et al. ............... | 366/97 X |
| 4,776,703 | 10/1988 | Oda et al. ............... | 366/300 X |
| 4,857,632 | 8/1989 | Ahlberg et al. ............... | 366/97 X |
| 4,883,361 | 11/1989 | Valentino et al. . | |
| 4,950,081 | 8/1990 | List ............... | 366/301 X |
| 5,230,562 | 7/1993 | Nishimi et al. ............... | 366/300 X |

FOREIGN PATENT DOCUMENTS

| | | |
|---|---|---|
| 0 144 092 | 6/1985 | European Pat. Off. . |
| 0 213 232 A1 | 3/1987 | European Pat. Off. . |
| 4129669 | 3/1992 | Germany ............... 366/300 |

*Primary Examiner*—Charles E. Cooley
*Attorney, Agent, or Firm*—Meltzer, Lippe, Goldstein, Wolf & Schlissel, P.C.

[57] ABSTRACT

A continuous kneading machine for doughs comprises a tub-shaped container, open at the top, which contains at least one pair of identical synchronously counterrotating kneading shafts. A series of U-shaped bracket components are attached to each kneading shaft longitudinally. The U-shaped bracket components are angularly offset relative to each other around the shaft circumference, with each bracket component being inclined in the direction of motion, such that the bracket components form a helical profile along the kneading shaft. A "manual" type of kneading is achieved due to the shearing off, pulling apart, and pressing together actions of the inventive shaft and bracket configuration.

3 Claims, 3 Drawing Sheets

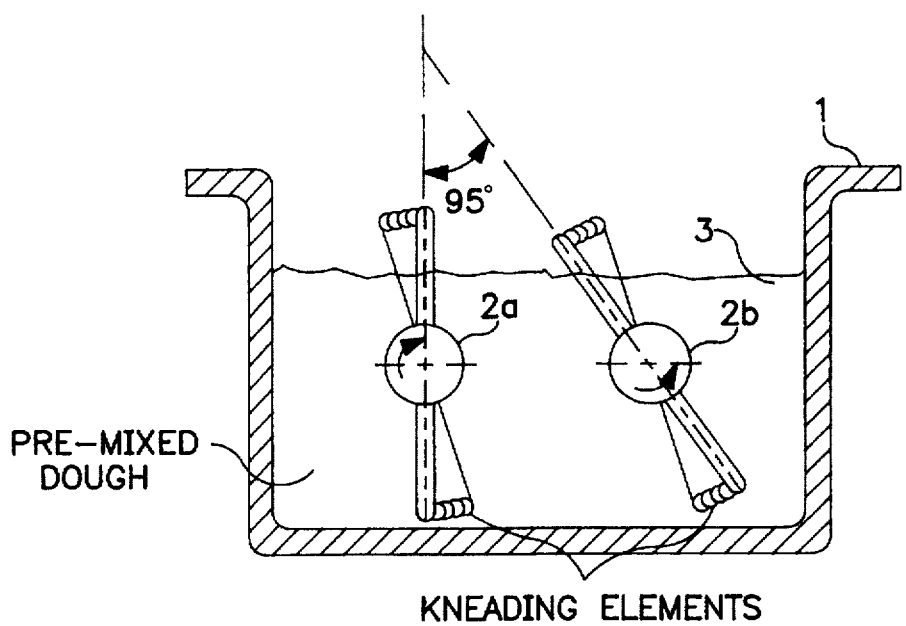
FIG. 1
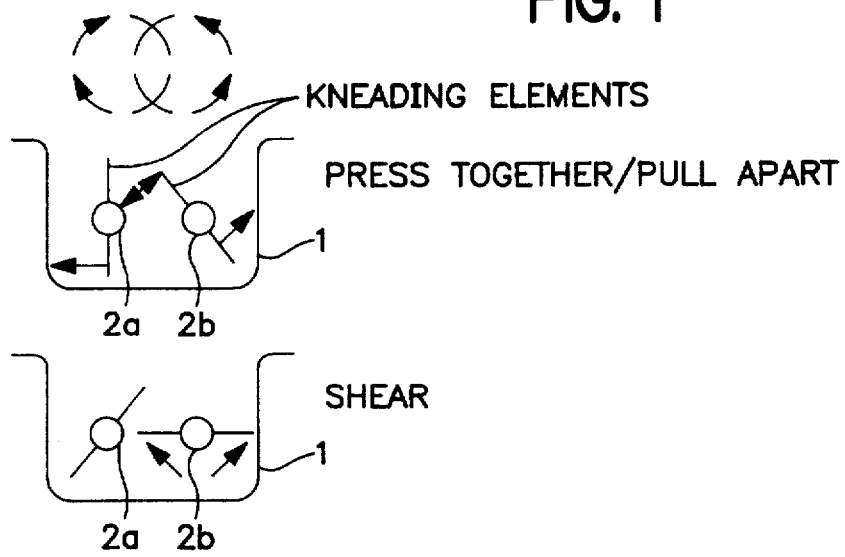
FIG. 1A
FIG. 1B
FIG. 1C
FIG. 1D

| 1=0° | 5=215° | 9=45° | 13=192,5° |
| 2=12,5° | 6=202,5° | 10=32,5° | 14=202,5° |
| 3=22,5° | 7=192,5° | 11=22,5° | 15=217,5° |
| 4=35° | 8=180° | 12=10° | 16=230° |

CONTINUOUS KNEADING MACHINE FOR DOUGHS

FIELD OF THE INVENTION

The present invention relates to a continuous kneading machine for doughs. More specifically, the present invention relates to a kneading apparatus which provides careful, manual-like kneading for doughs, which is especially effective for kneading wheat doughs.

SUMMARY OF THE INVENTION

In accordance with an illustrative embodiment of the present invention, a continuous kneading machine for doughs is configured with one or more pairs of identical kneading shafts, which are set within a tub-shaped container partially filled with dough, which has an open top. The kneading shafts are located below the surface level of the dough, and are synchronously counterrotated in pairs by an external drive mechanism. A series of longitudinally adjacent U-shaped bracket components are attached to each kneading shaft, with each bracket component being angularly offset relative to each other around the circumference of the kneading shaft. The U-shaped bracket components are each inclined in the direction of motion, such that they form a helical profile along the kneading shaft.

The angle of offset in the longitudinal direction between corresponding legs of adjacent bracket components around the circumference of the kneading shaft is, advantageously, 22.5°. Moreover, the opposing pairs of bracket components located at corresponding longitudinal positions on their respective kneading shafts are rotationally offset towards one another, advantageously, by 45°. As a result, a "manual" kneading simulation is achieved, which is especially effective for wheat doughs.

An illustrative embodiment of the present invention is more fully described below in conjunction with the following drawings:

BRIEF DESCRIPTION OF THE DRAWINGS

FIG. 1 a cross section through the trough;

FIG. 1a a cross section through the trough where kneading elements 2a and 2b press together/pull apart;

FIG. 1b a cross section through the trough where kneading elements 2a and 2b shear;

FIG. 1c a cross section through the trough where kneading elements 2a and 2b pull apart;

FIG. 1d a cross section through the trough where kneading elements 2a and 2b pull apart/press together;

DETAILED DESCRIPTION OF THE INVENTION

According to one embodiment, the present invention is a kneading machine, as depicted in FIG. 1. The machine is composed of a longitudinal container 1 which has the shape of a tub and is open at the top and of two synchronously driven kneading shafts 2a, 2b which counter-rotate. Within the trough 1 there is disposed premixed dough material which is filled up to the level of indicator line 3.

Figure 2:
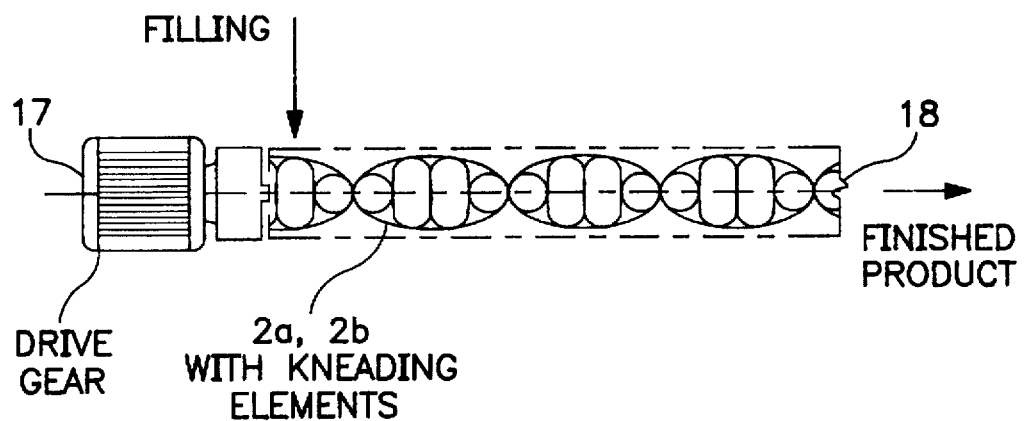
FIG. 2 a top view of one shaft.
Figure 3:
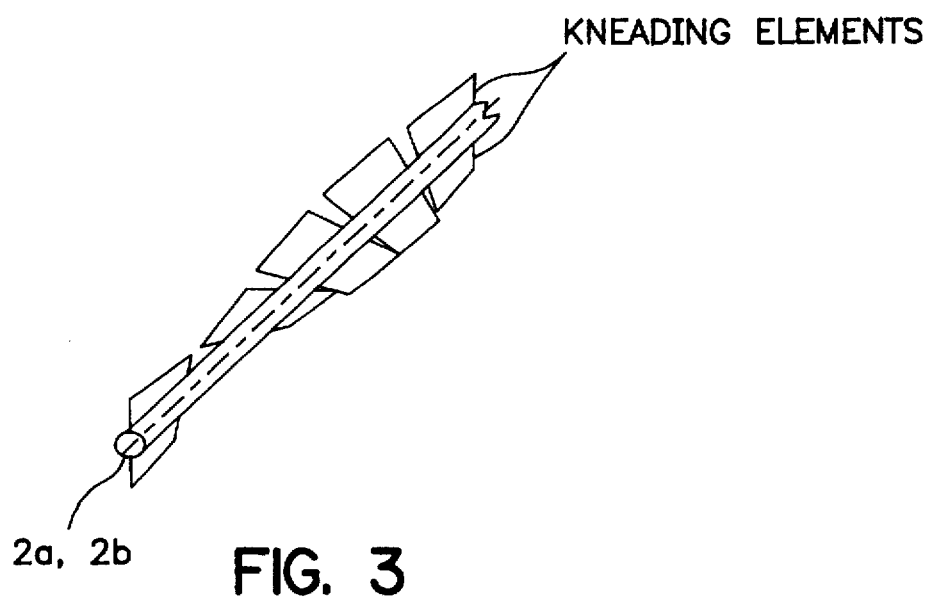
FIG. 3 a perspective view in the longitudinal direction.

As is shown in FIGS. 2 and 3, each of the synchronous shafts 2a, 2b is provided with kneading elements, of which each individual one has the shape of a U-shaped bracket, both of whose legs are attached to the shaft, with the base side of the U-shaped kneading element facing outwardly.

There are provided a plurality of two mutually diametrically opposite kneading elements for each shaft. In the longitudinal direction of the shafts 2a, 2b the individual kneading elements are adjacent nearly without any gap in between and form a helical profile as is outlined in FIGS. 2 and 3.

This occurs in such a way that in the longitudinal direction the respective following kneading element is arranged offset towards the previous element by a specific angle around the shaft circumference. e.g. 22.5°. Moreover, as is shown in FIG. 1 especially, each kneading element is slightly inclined in the direction of motion.

The kneading elements of the one kneading shaft 2a are offset by 45° towards the second kneading shaft 2b (FIG. 1).

The spatial arrangement of the kneading elements can be seen in the top view according to FIG. 2.

Figure 4:
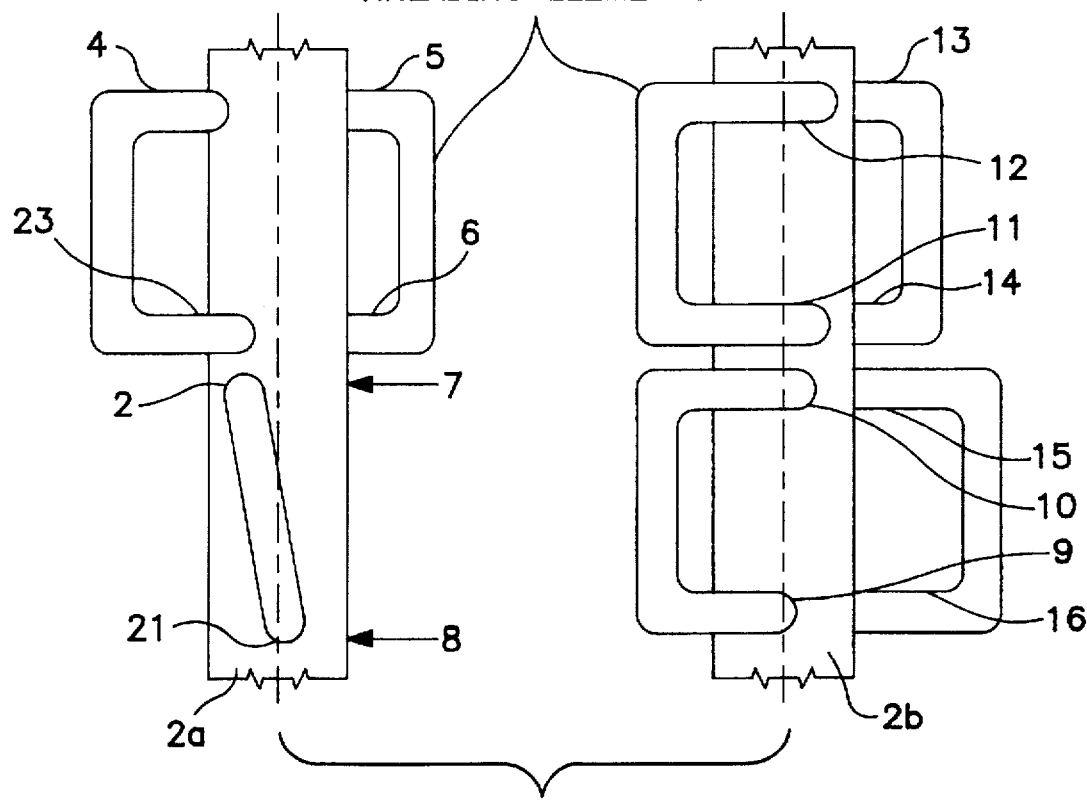
FIG. 4 views of the kneading elements in different angular positions.
Figure 4A:
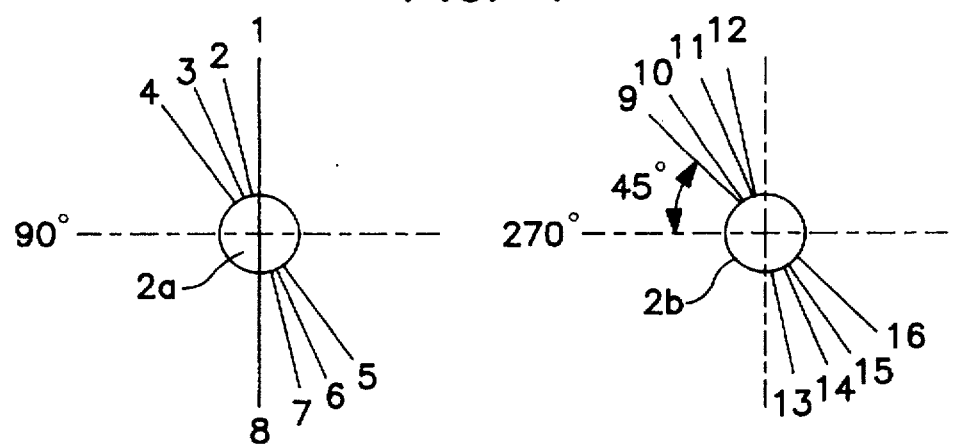
FIG. 4a views of the spatial distribution of the legs of the kneading elements 1–16 and the corresponding angular values.

FIG. 4 shows a representation of segments of a right shaft and a left shaft, to each one being attached two pairs of kneading elements with legs 9–16 and 1–8, respectively. The spatial distribution of the legs of the kneading elements 1–16 and the corresponding angular values can be seen in FIG. 4a, which shows as well an offset of 45° of leg 1 of the left shaft with respect to leg 9 of the right shaft. The kneading elements on each shaft form a closed helical line.

The machine operates as follows:

As a result of the synchronous counterrotating drive of the kneading shafts 2a, 2b, which are arranged with their central axle below the filling level within the trough (FIG. 1), a special kneading effect is obtained which enables a highly effective, but also careful kneading for wheat doughs in particular, namely in the manner of the "manual" kneading which is common in the bakery trade to date. Simultaneously, the product is conveyed from the inlet position 17 (FIG. 2) to the outlet position 18 out of the kneading machine in addition to the kneading process.

The function is explained with the help of FIG. 1 especially by reference to the diagrams shown in FIGS 1a–1d:

During the rotation of the right kneading shaft 2b the dough gets caught on the upper side of the kneading elements and is carried over the filling level 3. As soon as the kneading element shown in FIG. 1 as the lower element of the right kneading shaft 2b has been further rotated by 270°, the mass lying on it comes under the influence of the associated kneading element of kneading shaft 2a. (FIG. 1a) In this process a portion of the dough is sheared off at first by the outer edge of the kneading element of kneading shaft 2a (FIG. 1b) and thereafter pulled apart as a result of the divergent movement of the kneading elements involved in the process (FIG. 1c) as explained above, which occurs similarly during the kneading by hand.

As a result of this "pulling effect" in connection with the preceding "shearing" and "pressing together" (FIG. 1d) an excellent kneading effect is achieved especially for wheat doughs.

The invention claimed is:

1. A continuous kneading machine for doughs, comprising:

a tub-shaped container having an open top, said container being filled to a level with dough to be kneaded, one or more pairs of identical kneading shafts disposed within said tub-shaped container below said level of said dough, said kneading shafts being synchronously counterrotated in pairs by an external drive mechanism, each one of said kneading shafts having a plurality of longitudinally adjacent U-shaped bracket components attached to said kneading shaft, said adjacent U-shaped bracket components being angularly offset relative to each other around the circumference of their respective said kneading shaft, wherein opposing pairs of said U-shaped bracket components having the same longitudinal position on their respective said kneading shafts are rotationally offset towards one another, and wherein each one of said U-shaped bracket components is inclined in the direction of motion of said respective kneading shaft, such that said bracket components form a helical profile along their said respective kneading shaft.

2. The continuous kneading machine of claim 1 wherein the angle of offset in the longitudinal direction of said adjacent bracket components around said circumference of said respective kneading shaft is 22.5°.

3. The continuous kneading machine of claim 2 wherein said opposing pairs of said U-shaped bracket components are rotationally offset towards one another by 45°.

* * * * *